US012663298B2

(12) United States Patent
Zhu

(10) Patent No.: US 12,663,298 B2
(45) Date of Patent: Jun. 23, 2026

(54) FIBER OPTIC SENSOR AND MEASUREMENT METHOD, APPARATUS AND STORAGE MEDIUM

(71) Applicant: ZHEJIANG LAB, Hangzhou City (CN)

(72) Inventor: Chen Zhu, Hangzhou City (CN)

(73) Assignee: ZHEJIANG LAB, Hangzhou City (CN)

( * ) Notice: Subject to any disclaimer, the term of this patent is extended or adjusted under 35 U.S.C. 154(b) by 242 days.

(21) Appl. No.: 18/721,592

(22) PCT Filed: Jun. 30, 2023

(86) PCT No.: PCT/CN2023/104719
§ 371 (c)(1),
(2) Date: Jun. 18, 2024

(87) PCT Pub. No.: WO2024/148777
PCT Pub. Date: Jul. 18, 2024

(65) Prior Publication Data
US 2026/0153366 A1     Jun. 4, 2026

(30) Foreign Application Priority Data

Jan. 10, 2023    (CN) ......................... 202310035861.2

(51) Int. Cl.
*G01D 5/353*        (2006.01)
*G01D 5/34*         (2006.01)
(Continued)

(52) U.S. Cl.
CPC .............. *G01D 5/38* (2013.01); *G01D 5/345* (2013.01); *G01D 5/353* (2013.01);
(Continued)

(58) Field of Classification Search
CPC .......... G01D 5/38; G01D 5/345; G01D 5/353; G01D 5/35316; G01K 11/3206; G01L 1/246
See application file for complete search history.

(56) References Cited

U.S. PATENT DOCUMENTS 6,778,720 B1 *  8/2004  Cekorich ........... G01D 5/35383
356/463
2018/0313974 A1   11/2018  Barfoot et al.
(Continued)

FOREIGN PATENT DOCUMENTS

CN        103808342 A      5/2014
CN        205619942 U     10/2016
(Continued)

OTHER PUBLICATIONS

"High Speed Demodulation of Weak FBGs Based on Microwave Photonics and Chromatic Dispersion" to Lei Zhou et al. ARXIV, Oct. 18, 2017 (Year: 2017).*
(Continued)

*Primary Examiner* — Jonathan M Hansen
(74) *Attorney, Agent, or Firm* — Christopher R. Carroll; Carroll, Hoette & Butscher, LLC

(57)        ABSTRACT

The present application discloses a fiber optic sensor and a measurement method, apparatus, and storage medium. By performing, based on the microwave signal, intensity modulation on the optical signal, then inputting the modulated optical signal into the fiber optic containing the weak reflection grating array, a reflected signal is obtained. Thereafter by performing dispersion compensation on the amplified partial reflected signal, and based on the dispersion-compensated reflected signal and the non-dispersion-compensated reflected signal, the change amounts
(Continued)

respectively corresponding to positions in the fiber optic containing the weak reflection grating array are determined.

13 Claims, 5 Drawing Sheets

(51) Int. Cl.
  *G01D 5/38* (2006.01)
  *G01K 11/3206* (2021.01)
  *G01L 1/24* (2006.01)
(52) U.S. Cl.
  CPC ..... *G01D 5/35316* (2013.01); *G01K 11/3206* (2013.01); *G01L 1/246* (2013.01)

(56) References Cited

U.S. PATENT DOCUMENTS

2020/0249075 A1 * 8/2020 Ma ........................ G02B 26/04
2021/0262835 A1 * 8/2021 Sternklar ........... G01D 5/35316

FOREIGN PATENT DOCUMENTS

| | | |
|---|---|---|
| CN | 106840221 A | 6/2017 |
| CN | 113381815 A | 9/2021 |
| CN | 115962796 A | 4/2023 |
| WO | 2022237018 A1 | 11/2022 |

OTHER PUBLICATIONS

"FBG Demodulation with Enhanced Performance Based on Optical Fiber Relative Delay Measurement" to Lihan Wang et al. IEEE, vol. 32, No. 13, pp. 775-778, Jul. 1, 2020 (Year: 2020).*
ISA State Intellectual Property Office of the People's Republic of China, International Search Report Issued in Application No. PCT/CN2023/104719, Sep. 1, 2023, WIPO, 3 pages.
ISA State Intellectual Property Office of the People's Republic of China, Written Opinion of the International Searching Authority Issued in Application No. PCT/CN2023/104719, Sep. 1, 2023, WIPO, 7 pages.(Submitted with Machine/Partial Translation).
Li Wei et al, "Enhanced Phase Sensitive Optical Time-Domain Reflectometer Vibration Sensing System Based on Weak Grating Array", Chinese Journal of Lasers, vol. 45, No. 8, Aug. 2018, 8 pages. (Submitted with Abstract Translation).

* cited by examiner

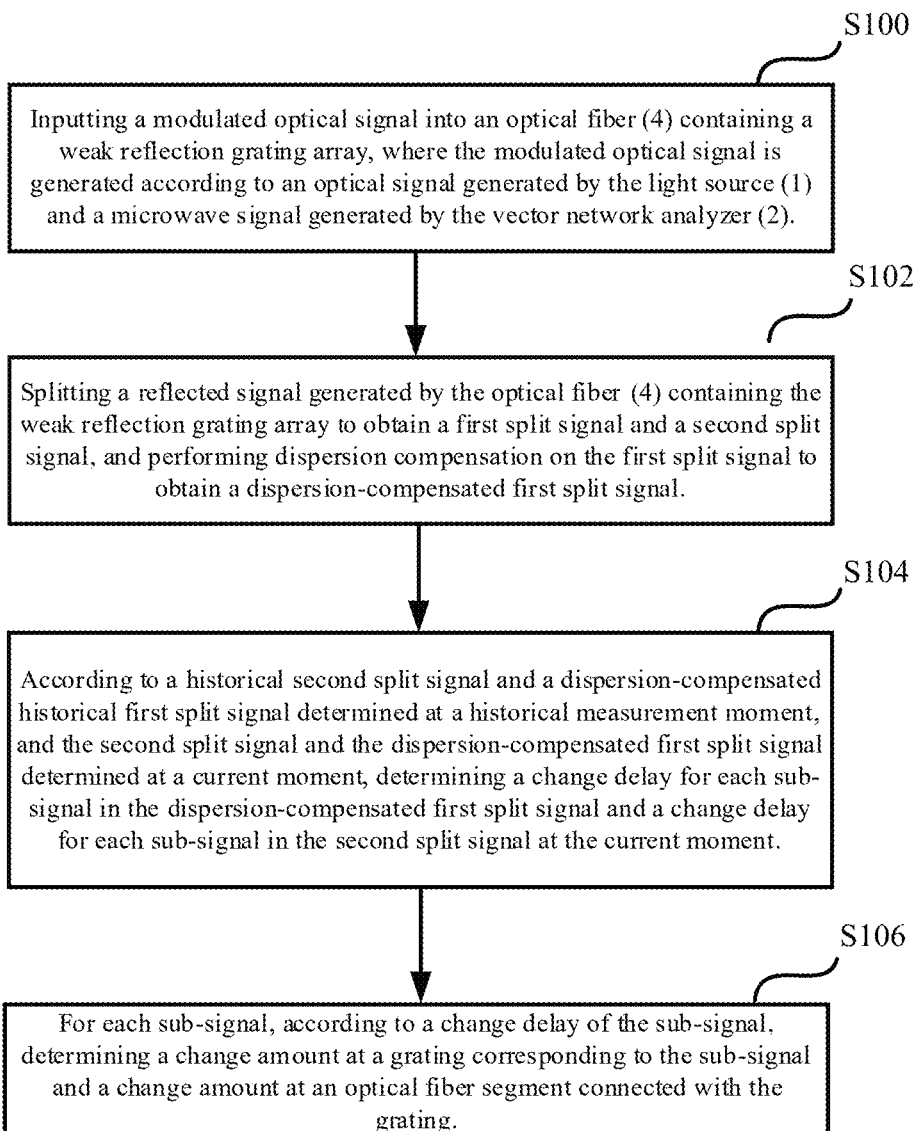

S100

Inputting a modulated optical signal into an optical fiber (4) containing a weak reflection grating array, where the modulated optical signal is generated according to an optical signal generated by the light source (1) and a microwave signal generated by the vector network analyzer (2).

S102

Splitting a reflected signal generated by the optical fiber (4) containing the weak reflection grating array to obtain a first split signal and a second split signal, and performing dispersion compensation on the first split signal to obtain a dispersion-compensated first split signal.

S104

According to a historical second split signal and a dispersion-compensated historical first split signal determined at a historical measurement moment, and the second split signal and the dispersion-compensated first split signal determined at a current moment, determining a change delay for each sub-signal in the dispersion-compensated first split signal and a change delay for each sub-signal in the second split signal at the current moment.

S106

For each sub-signal, according to a change delay of the sub-signal, determining a change amount at a grating corresponding to the sub-signal and a change amount at an optical fiber segment connected with the grating.

FIG. 5

FIBER OPTIC SENSOR AND MEASUREMENT METHOD, APPARATUS AND STORAGE MEDIUM

CROSS-REFERENCE TO RELATED APPLICATIONS

The present disclosure is a national phase entry of international PCT Application No. PCT/CN2023/104719, filed on Jun. 30, 2023, which claims priority to Chinese patent application No. 202310035861.2, filed with the China National Intellectual Property Administration on Jan. 10, 2023, both of which are incorporated herein by reference in their entireties.

TECHNICAL FIELD

The present disclosure relates to the technical field of fiber optic sensing, and in particular, to a fiber optic sensor and a measurement method, an apparatus, and a storage medium.

BACKGROUND

At present, fiber optic grating sensors (hereinafter also referred to as fiber optic sensors) are used in petrochemical, aerospace, civil engineering structures, national defense and other fields due to their light weight, electromagnetic interference resistance, corrosion resistance and other features.

Under normal circumstances, when the light is transmitted in a fiber optic sensor, the broadband incident light enters the fiber from one end of the sensor, and after encountering a fiber optic grating, most wavelengths of the light pass directly through the fiber grating as the transmitted light, and a small part of special wavelengths of the light is reflected back, and the special wavelengths are directly related to the grating pitch. If the temperature, stress, etc. in the external environment of the fiber optic sensor change, the grating pitch or refractive index changes, and the wavelength of the optical signal reflected back by each grating in the fiber optic sensor changes accordingly. Therefore, what the existing technology generally adopts is to: transmit pulsed light signals into the fiber optic sensor to obtain the reflected signal that is reflected back by the grating in the fiber optic sensor; by analyzing the wavelength change of the reflected signal, determine the change amounts at each grating in the fiber optic sensor; further, use the change amounts as the measurement results to determine the change amount of the external environment of the fiber optic sensor.

However, for fiber optic sensors used for long-distance measurement, due to the limited quantity of gratings contained in the fiber optic sensor, the above measurement method can only measure environmental changes at gratings but cannot measure environmental changes at the fiber optic segments connected with gratings, i.e., only can achieve discrete measurement.

SUMMARY

The present disclosure provides a fiber optic sensor, a measurement method, apparatus, and storage medium, to at least partially solve the above problems existing in the prior art.

The present application adopts the following technical solutions:

The present disclosure provides a fiber optic sensor, the fiber optic sensor at least includes the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8; where:

the electro-optic intensity modulator 3, coupled to the light source 1, the vector network analyzer 2, and the fiber optic 4 containing the weak reflection grating array, is configured to: modulate a microwave signal generated by the vector network analyzer 2 into an optical signal generated by the light source 1, and input a modulated optical signal into the fiber optic 4 containing the weak reflection grating array;

the fiber optic amplifier 5, coupled to the fiber optic 4 containing the weak reflection grating array and the fiber optic coupler 6, and configured to: receive a reflected signal output by the fiber optic 4 containing the weak reflection grating array, and input an amplified reflected signal into the fiber optic coupler 6;

the fiber optic coupler 6, coupled to the fiber optic amplifier 5, the dispersion compensator 7, and the demodulator 8, is configured to: split the amplified reflected signal, input an obtained first split signal into the dispersion compensator 7, and input an obtained second split signal into the demodulator 8;

the dispersion compensator 7, coupled to the fiber optic coupler 6 and the demodulator 8, is configured to: perform dispersion on the first split signal, and input a dispersion-compensated first split signal into the demodulator 8;

the demodulator 8, coupled to the fiber optic coupler 6 and the dispersion compensator 7, is configured to: demodulate a received signal to obtain each sub-signal of the second split signal and each sub-signal of the dispersion-compensated first split signal; according to a historical second split signal and a dispersion-compensated historical first split signal determined at a historical measurement moment, and the second split signal and the dispersion-compensated first split signal determined at a current moment, determine a change delay for each sub-signal in the dispersion-compensated first split signal and change a delay for each sub-signal in the second split signal at the current moment; and for each of the sub-signals, according to a change delay for the sub-signal, determine change amounts at a grating corresponding to the sub-signal and at a fiber optic segment connected with the grating. In some embodiments, the fiber optic coupler 6 includes a first fiber optic coupler 60 and a second fiber optic coupler 61;

the first fiber optic coupler 60, coupled to the fiber optic amplifier 5, the dispersion compensator 7, and the second fiber optic coupler 61, is configured to: split the amplified reflected signal which is amplified by the fiber optic amplifier 5, input the obtained first split signal into the dispersion compensator 7, and input the obtained second split signal into the second fiber optic coupler 61;

the dispersion compensator 7, coupled to the first fiber optic coupler 60 and the second fiber optic coupler 61, is configured to input the dispersion-compensated first split signal into the second fiber optic coupler 61;

the second fiber optic coupler 61, coupled to the first fiber optic coupler 60, the dispersion compensator 7, and the demodulator 8, is configured to: couple the dispersion-compensated first split signal and the second split signal, to obtain a signal to be measured, and input the signal to be measured into the demodulator 8.

In some embodiments, the fiber optic sensor further includes an optical amplifier coupled to the second fiber optic coupler 61 and the demodulator 8; the optical amplifier is configured to: receive the signal to be measured output by the second fiber optic coupler 61, amplify the signal to be measured, and input an amplified signal to be measured into the demodulator 8.

In some embodiments, the fiber optic sensor further includes a fiber optic circulator 10, where an input end of the fiber optic circulator 10 is coupled to an output end of the electro-optic intensity modulator 3, an input/output end of the fiber optic circulator 10 is coupled to the fiber optic 4 containing the weak reflection grating array, and an output end of the fiber optic circulator 10 is coupled to the fiber optic amplifier 5.

In some embodiments, the fiber optic sensor further includes a photodetector 9.

An input end of the photodetector 9 is coupled to an output end of the fiber optic coupler 6 and an output end of the dispersion compensator 7, and an output end of the photodetector 9 is coupled to an input end of the demodulator 8.

the photodetector 9 is configured to: obtain a first electrical signal corresponding to the dispersion-compensated first split signal, obtain a second electrical signal corresponding to the second split signal, and input the first electrical signal and the second electrical signal into the demodulator 8;

the demodulator 8 is further configured to: determine a historical first electrical signal determined at the historical measurement moment as the dispersion-compensated historical first split signal, determine a historical second electrical signal determined at the historical measurement moment as the historical second split signal, determine the first electrical signal determined at the current moment as the dispersion-compensated first split signal, and determine the second electrical signal determined at the current moment as the second split signal.

In some embodiments, the fiber optic sensor further includes a fiber optic polarizer coupled to the light source 1, and a fiber optic polarization controller coupled to the fiber optic polarizer and the electro-optic intensity modulator 3; where the fiber optic polarizer and the fiber optic polarization controller are configured to perform polarization control on the optical signal generated by the light source 1.

In some embodiments, the fiber optic 4 containing the weak reflection grating array includes a target fiber optic connected with an object to be measured and a reference fiber optic floatingly connected with the object to be measured; wherein, the demodulator 8 is further configured to: according to a received second split signal and a dispersion-compensated first split signal corresponding to the reference fiber optic, determine change amounts at each grating and at each fiber optic segment between gratings in the reference fiber optic, to obtain a first change amount; according to a received second split signal and a dispersion-compensated first split signal corresponding to the target fiber optic, determine change amounts at each grating and at each fiber optic segment between gratings in the target fiber optic, to obtain a second change amount; and according to the first change amount and the second change amount, determine a change amount of the object to be measured.

In some embodiments, the demodulator 8 is configured to: determine a dispersion compensation function corresponding to the dispersion compensator 7; for each of the sub-signals in the dispersion-compensated first split signal, according to the determined change delay of the signal and the dispersion compensation function, determine a change amount of a center wavelength of the grating corresponding to the sub-signal; and according to the change amount of the center wavelength and physical properties of the fiber optic 4 containing the weak reflection grating array, determine the change amount at the grating corresponding to the sub-signal; where, the physical properties at least include an elastic-optic effect coefficient and a thermo-optic effect coefficient.

In some embodiments, a dispersion delay introduced by the dispersion compensator 7 to perform dispersion includes a change delay and a historical delay;

the demodulator 8 is further configured to: according to the dispersion-compensated first split signal, determine dispersion delays of sub-signals respectively corresponding to gratings in the fiber optic 4 containing the weak reflection grating array; according to the dispersion-compensated historical first split signal, determine historical delays of the sub-signals respectively corresponding to the gratings in the fiber optic 4 containing the weak reflection grating array; and for each of the gratings, according to the historical delay and the dispersion delay of the sub-signal corresponding to the grating, determine a change delay of the sub-signal corresponding to the grating.

In some embodiments, the demodulator 8 is further configured to: for each of the gratings in the fiber optic 4 containing the weakly reflective grating array, according to the dispersion-compensated first split signal, determine a third delay of the sub-signal corresponding to the grating at the current moment, and a fourth delay of a sub-signal corresponding to an adjacent grating of the grating; and according to the third delay and the fourth delay determined at the current moment, and a historical third delay and a historical fourth delay determined according to the dispersion-compensated historical first split signal, determine the change delay.

In some embodiments, the demodulator 8 is further configured to: for every two adjacent sub-signals of the second split signal, determine delays when the two sub-signals are transmitted along the fiber optic 4 containing the weak reflection grating array, respectively as a first delay and a second delay determined at the current moment; according to the first delay and the second delay, and a historical first delay and a historical second delay determined according to the historical second split signal, determine an optical path delay; according to the optical path delay, determine a change amount of an optical path difference of the fiber optic segment between the two adjacent gratings corresponding to the two sub-signals; and according to the change amount of the optical path difference and physical properties of the fiber optic 4 containing the weak reflection grating array, determine a change amount at the fiber optic segment between the two adjacent gratings; where, the physical properties at least include an elastic-optic effect coefficient, a thermo-optic effect coefficient, an effective refractive index, and a physical length of the fiber optic segment between the two adjacent gratings.

In some embodiments, the change amount includes at least one of a temperature change amount or a deformation amount.

The present disclosure provides a measurement method, which is applied to a fiber optic sensor, the fiber optic sensor at least includes following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8; the method includes:

inputting a modulated optical signal into the fiber optic 4 containing the weak reflection grating array, where the modulated optical signal is generated according to an optical signal generated by the light source 1 and a microwave signal generated by the vector network analyzer 2;

splitting a reflected signal generated by the fiber optic 4 containing the weak reflection grating array to obtain a first split signal and a second split signal, and performing dispersion compensation on the first split signal to obtain a dispersion-compensated first split signal;

according to a historical second split signal and a dispersion-compensated historical first split signal determined at a historical measurement moment, and the second split signal and the dispersion-compensated first split signal determined at a current moment, determining a change delay for each sub-signal in the dispersion-compensated first split signal and a change delay for each sub-signal in the second split signal at the current moment; and for each sub-signal, according to a change delay for the sub-signal, determining a change amount at a grating corresponding to the sub-signal and a change amount at a fiber optic segment connected with the grating.

The present disclosure provides a measurement apparatus, where the measurement apparatus is applied to a fiber optic sensor, the fiber optic sensor at least includes following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8; the apparatus includes:

a modulation module, configured to: input a modulated optical signal into the fiber optic 4 containing the weak reflection grating array, where the modulated optical signal is generated according to an optical signal generated by the light source 1 and a microwave signal generated by the vector network analyzer 2;

a splitting module, configured to: split a reflected signal generated by the fiber optic 4 containing the weak reflection grating array to obtain a first split signal and a second split signal, and perform dispersion compensation on the first split signal to obtain a dispersion-compensated first split signal;

a first determination module, configured to: according to a historical second split signal and a dispersion-compensated historical first split signal determined at a historical measurement moment, and the second split signal and the dispersion-compensated first split signal determined at a current moment, determine a change delay for each sub-signal in the dispersion-compensated first split signal and a change delay for each sub-signal in the second split signal at the current moment; and a second determination module, configured to: for each sub-signal, according to a change delay for the sub-signal, determine a change amount at a grating corresponding to the sub-signal and a change amount at a fiber optic segment connected with the grating.

The present disclosure provides a computer-readable storage medium storing a computer program, where, when the computer program is executed by a processor, the above measurement method is implemented.

The present disclosure provides an electronic device, including a memory, a processor, and a computer program stored in memory and executable on the processor, where, when the processor executes the program, the above measurement method is implemented.

At least one technical solution described above adopted in the present application can achieve the following beneficial effects:

It can be seen from the above method: based on the microwave signal, performing intensity modulation on the optical signal; then inputting the modulated optical signal into the fiber optic containing the weak reflection grating array to obtain a reflected signal; thereafter splitting an amplified reflected signal to obtain the first split signal and the second split signal; then performing dispersion compensation on the first split signal; then based on the dispersion-compensated first split signal, the second split signal, the historical second split signal and the dispersion-compensated historical first split signal determined at a historical measurement moment, determining the change amounts corresponding to each position in the fiber optic containing the weak reflection grating array.

The fiber optic sensor in the present disclosure adopts a fiber optic containing a weak reflection grating array and a dispersion compensator, which may, based on the second split signal and the dispersion-compensated first split signal, as well as the historical second split signal and the dispersion-compensated historical first split signal determined at the historical measurement moment, accurately determine the change amounts for each grating and each fiber optic segment between the gratings in the fiber optic containing the weak reflection grating array, thus achieving fully distributed measurement.

BRIEF DESCRIPTION OF DRAWINGS

The drawings described here are used to provide a further understanding of the present disclosure and constitute a part of the present disclosure. The illustrative embodiments and descriptions of the present disclosure are used to explain the present disclosure and do not constitute improper limitations on the present disclosure. Among the drawings:

FIG. 5 is a flowchart of a measurement method provided in the present disclosure;

DETAILED DESCRIPTION

Figure 1:
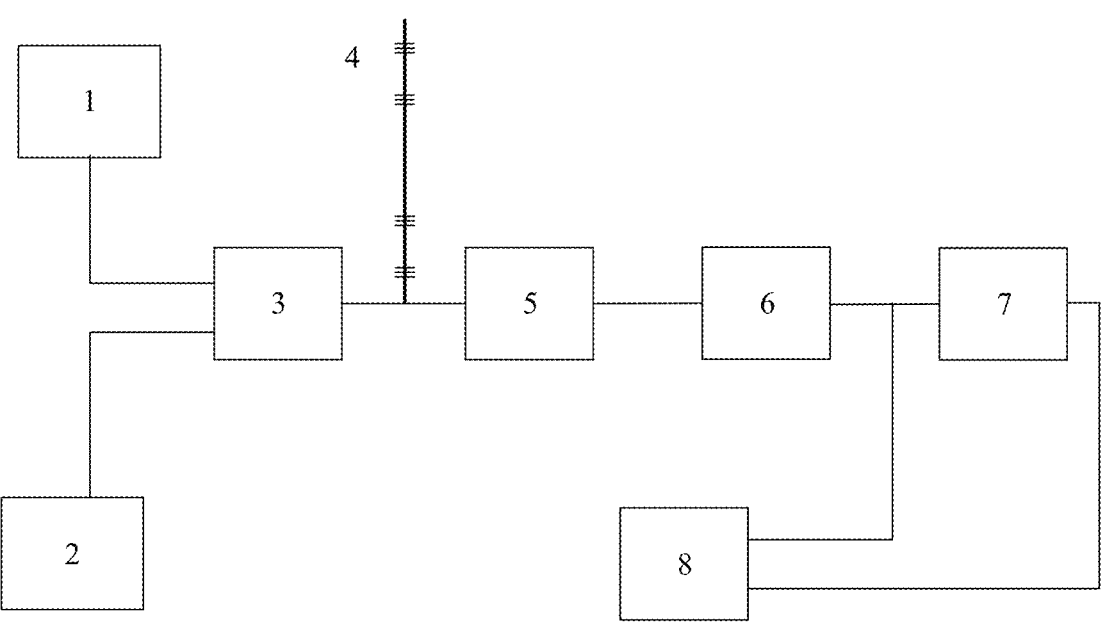
FIG. 1 is a structural diagram of a fiber optic sensor provided in the present disclosure.

In order to make the purpose, the technical solution, and the advantages of the present disclosure clearer, the technical solution of the present disclosure will be described clearly and comprehensively with reference to specific embodiments of the present disclosure and corresponding drawings. Obviously, the described embodiments are only a part, but not all, of the embodiments of the present disclosure. Based on the embodiments of the present disclosure, all other embodiments obtained by a person of ordinary skill in the art without creative efforts shall fall within the scope of protection of the present disclosure.

The technical solutions provided by the embodiments of the present disclosure will be described in detail below with reference to the drawings.

In the field of sensors, the application of fiber optic sensors is becoming more and more common. Correspondingly, how to determine the change amounts of the surrounding environment based on fiber optic sensors is one of the problems that currently needs to be solved.

A commonly used measurement method based on fiber optic sensors includes: emitting a pulse light signal into a fiber optic containing gratings to obtain a returned pulse light signal (i.e., a reflected signal) from the fiber optic containing gratings, then based on the difference between the emitted pulse light signal and the received pulse light signal, determining change amounts respectively corresponding to the gratings in the fiber optic containing gratings, and then determining the change amount of the surrounding environment. The reflected signal returned by the fiber optic containing gratings includes the reflected signal generated by each grating in the fiber optic containing gratings after receiving the incident pulse light signal. For each grating, the grating may reflect the optical signal having the frequency corresponding to its own center wavelength in the incident pulse optical signal, and transmit other optical signals except the optical signal having the frequency corresponding to the center wavelength, so that the other optical signals continue to be transmitted.

However, for fiber optic sensors used for long-distance measurement, due to the limited quantity of gratings contained in the fiber optic sensor, the above measurement method can only measure environmental change at a grating but cannot measure environmental changes at each fiber optic segment between gratings, i.e., which only can achieve discrete measurement.

Based on this, the present disclosure provides a fiber optic sensor and a measurement method of fiber optic sensors, which is used to solve the problem that the above-mentioned fiber optic sensor can only perform discrete measurement.

The present disclosure provides a fiber optic sensor and a measurement method of fiber optic sensors, the method includes: based on the microwave signal, performing intensity modulation on the optical signal, then inputting the modulated optical signal into the fiber optic containing the weak reflection grating array to obtain a reflected signal, thereafter splitting an amplified reflected signal to obtain the first split signal and the second split signal, then performing dispersion compensation on the first split signal, then based on the dispersion-compensated first split signal, the second split signal, the historical second split signal and the dispersion-compensated historical first split signal determined at a historical measurement moment, determining the change amount for each of positions in the fiber optic containing the weak reflection grating array. It can be known from the above description that, the fiber optic sensor in the present disclosure adopts a fiber optic containing a weak reflection grating array and a dispersion compensator, which may, based on the second split signal and the dispersion-compensated first split signal, as well as the historical second split signal and the dispersion-compensated historical first split signal determined at the historical measurement moment, accurately determine the change amount for each grating and each fiber optic segment between the gratings in the fiber optic containing the weak reflection grating array, thus achieving fully distributed measurement.

FIG. 1 is a structural diagram of a fiber optic sensor provided in the present disclosure, where, the fiber optic sensor consists of at least the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8. For ease of description, the fiber optic 4 containing the weak reflection grating array is referred to as the fiber optic 4 hereinafter.

The light source 1 is used to generate optical signals, and the vector network analyzer 2 is used to generate microwave signals. As mentioned earlier, in the present disclosure, based on the microwave signal, the intensity modulation may be performed on the optical signal, therefore, the output end of the light source 1 and the output end of the vector network analyzer 2 may be connected with the input end of the electro-optic intensity modulator 3.

In a feasible implementation, the fiber optic sensor may include a fiber optic polarizer coupled to the light source 1, and a fiber optic polarization controller coupled to the fiber optic polarizer, the light source 1 may generate a low-coherence optical carrier, the low-coherence optical carrier may pass through the fiber optic polarizer and the fiber optic polarization controller in sequence, to perform polarization control. The optical signal output by the fiber optic polarization controller may be input to the electro-optic intensity modulator 3. In this embodiment, using the fiber optic polarizer and the fiber optic polarization controller to perform polarization control on an optical signal is beneficial for improving the modulation efficiency of the electro-optic intensity modulator 3 and ensuring signal stability. In another feasible implementation, the vector network analyzer 2 may be used to: generate a radio frequency signal, and then based on the radio frequency signal, perform intensity modulation on an optical signal.

The electro-optic intensity modulator 3 is used to according to the microwave signal, perform modulation on the optical signal generated by the light source 1. In the fiber optic sensor, the modulated optical signal may be transmitted to the fiber optic 4 containing the weak reflection grating array, to obtain a reflected signal returned by the fiber optic 4 containing the weak reflection grating array, and then based on the reflected signal, determine whether there is deformation and a corresponding deformation amount at each position in the fiber optic 4 containing the weak reflection grating array. Therefore, the output end of the electro-optic intensity modulator 3 may be connected with the fiber optic 4 containing the weak reflection grating array.

For each weak reflection grating in the fiber optic 4 containing the weak reflection grating array, when receiving an optical signal, the weak reflection grating may reflect an optical signal having the frequency corresponding to the center wavelength of the weak reflection grating, and the intensity of the reflected optical signal only accounts for one percent or less of the intensity of an optical signal reflected by conventional gratings.

It should be noted that, in the present disclosure, the change amount of the surrounding environment at each position in the fiber optic 4, which contains the weak reflection grating array, is determined based on the reflected signal of each grating in the fiber optic 4. Therefore, for the fiber optic 4 containing the weak reflection grating array, the incident end of the optical signal is the outgoing end of the reflected signal.

In addition, in the present disclosure, a fiber optic 4 containing a weak reflection grating array is adopted to determine environmental changes. Due to the relatively low intensity of the reflected signal returned by the fiber optic 4 containing the weak reflection grating array, if the environmental change is determined directly based on the reflected signal, the situation where the determined environmental change is inaccurate may occur. To mitigate this, the fiber optic 4 containing the weak reflection grating array may also be connected with the input end of the fiber optic amplifier 5.

In addition, a fiber optic circulator or a component with similar functions may also be provided between the electro-optic intensity modulator 3, the fiber optic 4, and the fiber optic amplifier 5. An input end of the fiber optic circulator is connected with an output end of the electro-optic intensity modulator 3, an input/output end of the fiber optic circulator is connected with the fiber optic 4, an output end of the fiber optic circulator is connected with the fiber optic amplifier 5. By using a fiber optic circulator, the input end and output end of the fiber optic circulator may be isolated.

The fiber optic amplifier 5 may amplify a reflected signal after receiving the reflected signal to obtain an amplified reflected signal.

In addition, the operations used in the present disclosure are: splitting the reflected signal, and performing dispersion compensation on one split reflected signal obtained by the splitting, so as to determine the environmental changes around the fiber optic 4 containing the weak reflection grating array in the fiber optic sensor based on the dispersion-compensated split reflected signal and the other split reflected signal. Therefore, the output end of the fiber optic amplifier 5 may be connected with the input end of the fiber optic coupler 6.

The fiber optic coupler 6 is used to split the reflected signal amplified by the fiber optic amplifier 5 to obtain the first split signal and the second split signal, input the obtained first split signal into the dispersion compensator 7, and input the second split signal into the demodulator 8.

The dispersion compensator 7 is used to perform dispersion compensation on the received first split signal to obtain a dispersion-compensated first split signal. The reflected signal received by the fiber optic amplifier 5 may be considered as a superposition of a plurality of sub-signals. Each sub-signal corresponds to a grating in the fiber optic 4 containing the weak reflection grating array. Therefore, the first split signal may also contain a plurality of sub-signals, and each sub-signal likewise corresponds to a grating in the fiber optic 4 containing the weak reflection grating array.

When performing dispersion compensation on an optical signal, the dispersion compensator 7 usually compresses the spectrum corresponding to the optical signal, and delays the optical signal based on parameters such as a central frequency or a center wavelength corresponding to the optical signal while compressing the spectrum of the optical signal. Therefore, after receiving the first split signal, this represents that the dispersion compensator 7 performs dispersion compensation and dispersion delay on each sub-signal in the first split signal. By comparing the sub-signal after the dispersion compensation with the sub-signal before the dispersion compensation, the time difference between the two may be the dispersion delay corresponding to the sub-signal. Therefore, the dispersion-delayed signal may be used as the dispersion-compensated first split signal, and the first split signal is input to the demodulator 8.

For each grating in the fiber optic 4 containing the weak reflection grating array, as the environment around the grating changes, causing shifts in the grating pitch or refractive index, the center wavelength of the reflected light from the grating (also may be referred to as the center wavelength corresponding to the grating) also changes, so the reflected signal of the grating changes as well. Therefore, when receiving a reflected signal, the demodulator 8 may determine a change amount of the center wavelength corresponding to each grating according to the received reflected signal, and then determine a change amount of the surrounding environment of each grating based on the change amount of the center wavelength.

Figure 8:
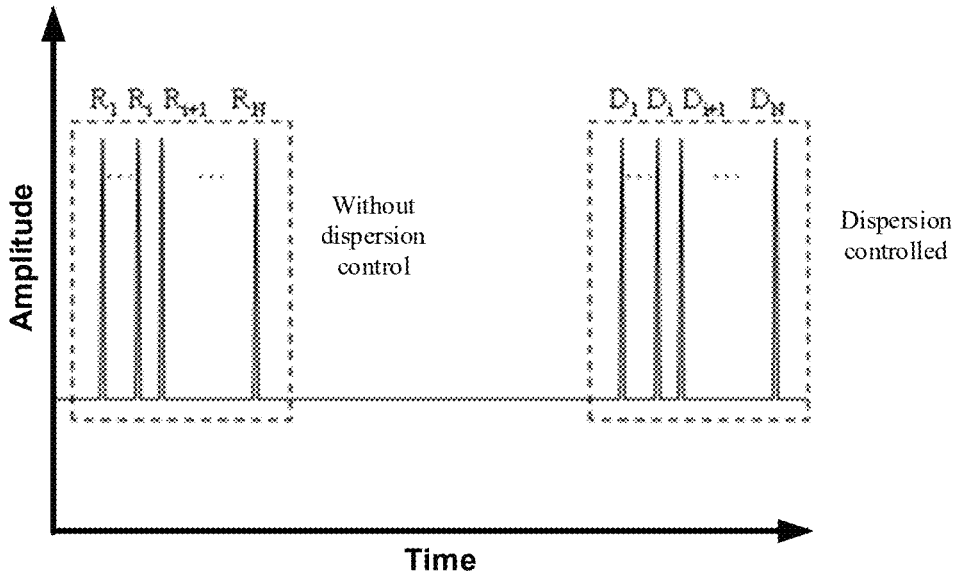
FIG. 8 is a time domain signal diagram provided in the present disclosure.

Specifically, the demodulator 8 may detect the frequency of the received signal, obtain the amplitude and phase information at the frequency, and complete synchronous measurement at each frequency by scanning the frequency of the received signal, thereby obtaining, at each frequency, the amplitude and phase response of the fiber optic sensor, i.e., the frequency domain response. After obtaining the frequency domain response of the fiber optic sensor, applying the inverse Fourier transform to it, the time domain response signal of the fiber optic sensor may be calculated. The time domain response signal of the fiber optic sensor may be the superposition of a series of sinc functions with different center points, these sinc functions with different center points are equivalent to different sub-signals, including the sub-signals of the dispersion-compensated first split and the sub-signals of the second split. For example, FIG. 8 is a time domain signal diagram disclosed in the embodiments of the present disclosure, where, $R_1$, $R_i$, $R_{i+1}$, $R_N$, etc. may represent the sub-signals of the second split signal that has not been dispersion-compensated, $D_1$, $D_i$, $D_{i+1}$, $D_N$, etc. may represent the sub-signals of the first split signal that has been dispersion-compensated.

For each sub-signal in the dispersion-compensated first split signal, the dispersion delay of the sub-signal includes a change delay and a fixed delay. The fixed delay may be determined based on the initial center wavelength of the grating corresponding to the sub-signal, or may be determined based on the historical center wavelength of the grating corresponding to the sub-signal determined at a historical measurement moment. The change delay may be determined based on the change amount of the center wavelength of the grating corresponding to the sub-signal from the historical measurement moment to the current moment, or based on the change amount of the center wavelength of the grating corresponding to the sub-signal from the initial state to the current moment. The center wavelength corresponding to the grating in its initial state is predetermined during the manufacturing process of the grating, and is determined by parameters such as the grating pitch corresponding to the grating.

Therefore, for the second split signal and the dispersion-compensated first split signal, the demodulator 8 may determine the change delays respectively corresponding to each sub-signal in this first split signal, and then for each sub-signal, according to the change delay corresponding to the sub-signal, determine the change amount of the grating corresponding to the sub-signal.

In another feasible implementation, the demodulator 8 may, based on the dispersion-compensated first split signal and the dispersion-compensated historical first split signal of the historical measurement moment, determine the change delays respectively corresponding to the sub-signals in the first split signal, and the specific processing process will be explained in detail later.

In another feasible implementation, the demodulator 8 may, based on the second split signal and the historical second split signal of the historical measurement moment, determine the change amount at each fiber optic segment between gratings in the fiber optic 4, and the specific processing process will be explained in detail later.

Furthermore, under normal circumstances, due to the high difficulty of detecting optical signals, the cost of the device that directly processes optical signals is also high. Therefore, in order to save costs, the fiber optic sensor in the present disclosure may also be provided with a photodetector, which converts the detected optical signal into an electrical signal, and then sends the converted electrical signal to the demodulator 8 for processing.

Figure 2:
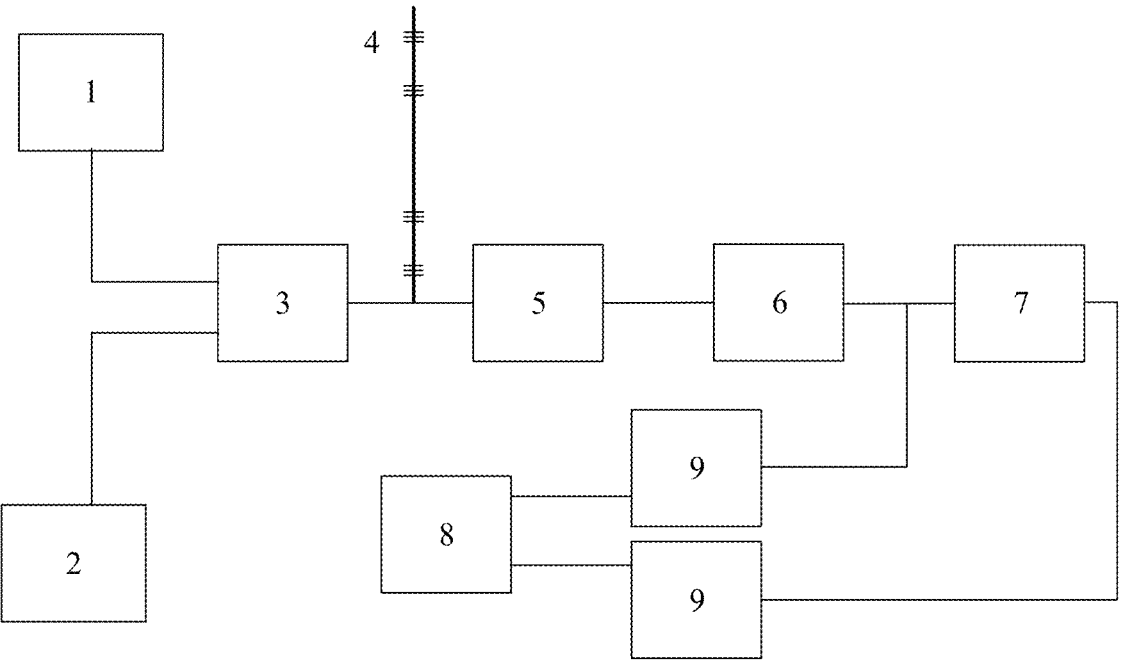
FIG. 2 is a structural diagram of a fiber optic sensor provided in the present disclosure.

Specifically, FIG. 2 is a structural diagram of a fiber optic sensor provided in the present disclosure. The fiber optic sensor consists of at least the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8, and a photodetector(s) 9.

An output end of the fiber optic coupler 6 is coupled to an input end of the photodetector 9, an output end of the dispersion compensator 7 is coupled to the input end of the photodetector 9, and an output end of the photodetector 9 is coupled to an input end of the demodulator 8.

The photodetector 9 connected to the output end of the fiber optic coupler 6 and the photodetector 9 connected to the output end of the dispersion compensator 7 may be the same or different photodetectors. In FIG. 2 illustrates an example using two different photodetectors. The specific quantity of photodetectors in the fiber optic sensor and the connection relationships with other components can be adjusted as needed, which is not limited in the present disclosure.

Then the photodetector 9 may convert the received optical signal into an electrical signal, and the demodulator 8 determines the environmental data of the fiber optic 4 containing the weak reflection grating array based on the received electrical signal.

Specifically, after obtaining the first electrical signal corresponding to the dispersion-compensated first split signal, and the second electrical signal corresponding to the second split signal, the photodetector 9 may input the first electrical signal and the second electrical signal into the demodulator 8. The demodulator 8 may regard the first electrical signal determined at the current moment as the dispersion-compensated first split signal, and the second electrical signal determined at the current moment as the second split signal, and based on the first split signal and the second split signal determine the environmental data of the fiber optic 4 containing the weak reflection grating array.

Specifically, assuming that the amplitude of the optical signal generated by the light source 1 is A, the angular frequency of the optical signal is ω, the initial phase of the optical signal is φ, the amplitude of the microwave signal generated by the vector network analyzer 2 is M, the modulation depth is h, the angular frequency of the microwave signal is Q, and the initial phase of the microwave signal is Ø. The optical signal modulated by the electro-optic intensity modulator 3 may be expressed as:

$$E = Ae^{[-j(\omega t+\varphi)]}\sqrt{1 + hM\cos{(\Omega t + \emptyset)}}$$

Where, E represents the intensity of the modulated optical signal.

Then, for each weak reflection grating in the fiber optic 4 containing the weak reflection grating array, assuming that the total number of weak reflection gratings is N, when the weak reflection grating is the i-th weak reflection grating, $D_i$ represents the effective reflectivity of the weak reflection grating, $t_i$ represents the delay when the reflected signal generated by the weak reflection grating is transmitted along the fiber optic. Then the reflected signal may be expressed as:

$$E_r = \sum_{i=1}^{N} D_i e^{\{-j[\omega(t+2t_i)+\varphi]\}}\sqrt{1 + hM\cos{[\Omega(t + 2t_i) + \emptyset]}}$$

Where, $E_r$ represents the intensity of the reflected signal.

The second split signal obtained by splitting the reflected signal may be expressed as:

$$E_{r1} = \frac{\sqrt{2}}{2}\sum_{i=1}^{N} D_i e^{\{-j[\omega(t+2t_i+K)+\varphi]\}}\sqrt{1 + hM\cos{[\Omega(t + 2t_i + K) + \emptyset]}}$$

The dispersion-compensated first split signal may be expressed as:

$$E_{r2} =$$

$$\sqrt{F}\frac{\sqrt{2}}{2}\sum_{i=1}^{N} D_i e^{\{-j[\omega(t+2t_i+K+G_i)+\varphi]\}}\sqrt{1 + hM\cos{[\Omega(t + 2t_i + K + G_i) + \emptyset]}}$$

Where, K represents the link delay caused by the transmission of the reflected signal along the link formed by the above-mentioned fiber optic amplifier 5, fiber optic coupler 6, photodetector 9 and other components, F represents the loss of the dispersion compensator 7, $G_i$ represents the dispersion delay introduced by the dispersion compensator 7 for the i-th grating.

Then after receiving the electrical signals sent by the photodetector 9, the demodulator 8 may, based on the received electrical signals, determine the frequency domain response and time domain response corresponding to the electrical signals, then based on the frequency domain response and time domain response, determine the specific values of the $t_i$, K, $G_i$ and other parameters.

As described above, for each sub-signal in the dispersion-compensated first split signal, the dispersion delay of the sub-signal includes a change delay and a fixed delay. In the present disclosure, the change delay may be determined, and then based on the change delay, the change amount of the grating corresponding to the sub-signal is determined. After the dispersion delay is determined, if the change delay needs to be determined, then the fixed delay needs to be determined first.

Specifically, the demodulator 8 may obtain the dispersion-compensated historical first split signal and the historical second split signal determined at the historical measurement moment. For example, the demodulator 8 may regard a historical first electrical signal determined at the historical measurement moment as the dispersion-compensated historical first split signal, and regard a historical second electrical signal determined at the historical measurement moment as the historical second split signal. The historical measurement moment may be a previous measurement moment, the initial measurement moment, or any one measurement moment between the initial measurement moment and the previous measurement moment. When using a fiber optic sensor to measure environmental changes around an object to be measured, the initial measurement moment may be the first measurement moment after the fiber optic sensor is fixed on the object to be measured. Of course, the demodulator 8 may also determine a specified number of historical measurement moments from all of historical measurement moments as specific measurement moments, and then obtain the dispersion-compensated historical first split signal and the historical second split signal determined at each specific measurement moment. The number of specific measurement moments determined by the demodulator 8 and the corresponding specific moments may be set as needed, which is not limited in the present disclosure.

Therefore, the demodulator 8 may determine the dispersion delays of sub-signals respectively corresponding to the gratings in the fiber optic 4 at the historical measurement moment based on the dispersion-compensated historical first split signal and the historical second split signal determined at the historical measurement moment, which is regarded as the historical delays respectively corresponding to the gratings in the fiber optic 4 at the current moment, that is, the fixed delay described above.

Secondly, for each sub-signal, after determining the fixed delay of the grating corresponding to the sub-signal, the demodulator 8 may determine the dispersion delay of the sub-signal corresponding to each grating in the fiber optic 4 according to the second split signal and the dispersion-compensated first split signal determined at the current moment. For each grating, the change delay of the sub-signal corresponding to the grating is determined according to the fixed delay and dispersion delay of the sub-signal corresponding to the grating.

Then, after determining the change delay, the demodulator 8 may determine the corresponding dispersion compensation function of the dispersion compensator 7. Then according to the dispersion compensation function and the change delay, the demodulator 8 may determine the change amount of the center wavelength of the sub-signal.

Assuming that the dispersion compensation function is K( ) for the sub-signal corresponding to the i-th grating in the fiber optic 4, the center wavelength of the sub-signal is $\lambda_i$, the change amount of the center wavelength of the sub-signal is $\Delta\lambda_i$, the change delay is $\Delta T_i$, then the following formula may be obtained:

$$\Delta T_i = K(\lambda_i + \Delta\lambda_i) - K(\lambda_i).$$

Then, according to the known change delay and the known center wavelength, the demodulator 8 may determine the change amount $\Delta\lambda_i$ of the center wavelength of the sub-signal, that is, the change amount of the center wavelength of the grating corresponding to the sub-signal.

Lastly, the demodulator 8 may determine the change amount of the grating corresponding to the sub-signal according to the determined change amount $\Delta\lambda_i$ of the center wavelength and the physical properties of the fiber optic 4 containing the weak reflection grating array. For example, the physical properties of the fiber optic 4 containing a weak reflection grating array are the elastic-optic effect coefficient O of the fiber optic, the thermo-optic effect coefficient P of the fiber optic, and the thermal expansion coefficient Q of the fiber optic. Based on the formula of the change amount of the center wavelength of the grating, the following formula may be established:

$$\Delta\lambda_i = \lambda_i[(1 - O)X_G + (P + Q)Z_G]$$

Where, $X_G$ represents the strain degree of the grating, where the strain represents the change of the material relative to its initial length, that is, the change of the length of the grating compared to the initial length. $Z_G$ represents the change amount of the grating temperature.

Further, when a certain physical property of the fiber optic has a relatively small value, the demodulator 8 may also determine the change amount of the grating based on other physical properties except the physical property and the change amount of the center wavelength of the grating. The change amount of the grating may include the change of strain degree of the grating and/or the grating temperature when the environment around the grating changes. After determining the change amount of the grating, the change amount of the environment around the grating can be determined, and then the environmental data of the surrounding environment can be obtained.

Assuming that the thermal expansion coefficient Q of the fiber optic 4 containing the weak reflection grating array is $5.5\times10^{-7}$, then the demodulator 8 may count the thermal expansion coefficient as 0, and may determine $X_G$ and $Z_G$ directly based on $\Delta\lambda_i=\lambda_i[(1-O)X_G+PZ_G]$. Of course, for the purposes of the present disclosure, the demodulator 8 may determine the specific value of $X_G$ or $Z_G$ based on the change amounts of the center wavelengths respectively corresponding to each grating at the historical measurement moment and the change amounts of the center wavelengths respectively corresponding to each grating at the current moment, or just determine the corresponding relationship between $X_G$ and $Z_G$. The specific expression of the determined change amount of the grating, and how to determine the change amount of the grating after determining the change amount of the center wavelength of the grating, may be adjusted as needed, which is not limited in the present disclosure.

In a feasible implementation, the embodiments of the present disclosure also provide an implementation manner for determining the change delay. The demodulator 8 may be used to: according to the dispersion-compensated first split signal, determine dispersion delays of sub-signals respectively corresponding to each grating in the fiber optic 4 containing the weak reflection grating array; according to the dispersion-compensated historical first split signal, determine historical delays of the sub-signals respectively corresponding to each of the gratings in the fiber optic 4 containing the weak reflection grating array; and for each of the gratings, according to the historical delay and the dispersion delay of the sub-signal corresponding to the grating, determine a change delay of the sub-signal corresponding to the grating.

Specifically, the demodulator 8 may be used to determine, for each weak reflection grating in the fiber optic 4, according to the dispersion-compensated first split signal, the third delay of the sub-signal corresponding to the grating and the fourth delay of the sub-signal corresponding to the adjacent grating of the grating at the current moment. For the i-th grating, the adjacent grating of the grating may be the (i+1)-th grating. By performing frequency domain-time domain change processing on the first split signal, a series of sinc functions with different center points may be obtained, each sinc function corresponds to a sub-signal, that is, to a grating. In addition, the center position of each sinc function is related to the delay of the corresponding grating, and the delay of the corresponding grating may be calculated based on the center position. Thus, the third delay of the i-th grating and the fourth delay of the (i+1)-th grating may be determined.

The demodulator 8 may obtain the historical third delay and the historical fourth delay determined according to the dispersion-compensated historical first split signal. The historical third delay may be the delay of the sub-signal corresponding to the grating at the historical measurement moment, and the historical fourth delay may be the delay of the sub-signal corresponding to the adjacent grating at the historical measurement moment. The demodulator 8 may determine the change delay according to the third delay, the fourth delay, the historical third delay, and the historical fourth delay. For example, the demodulator 8 may: calculate the difference between the fourth delay $D_{i+1}$ and the third delay $D_i$, as well as the historical difference between the historical fourth delay $D_{i+1}'$ and the historical third delay $D_i'$, and calculate the difference between the two differences, then use the difference as a change delay. Then, according to the change delay and the known center wavelength, the demodulator 8 may determine the change amount $\Delta\lambda_i$ of the center wavelength.

Figure 3:
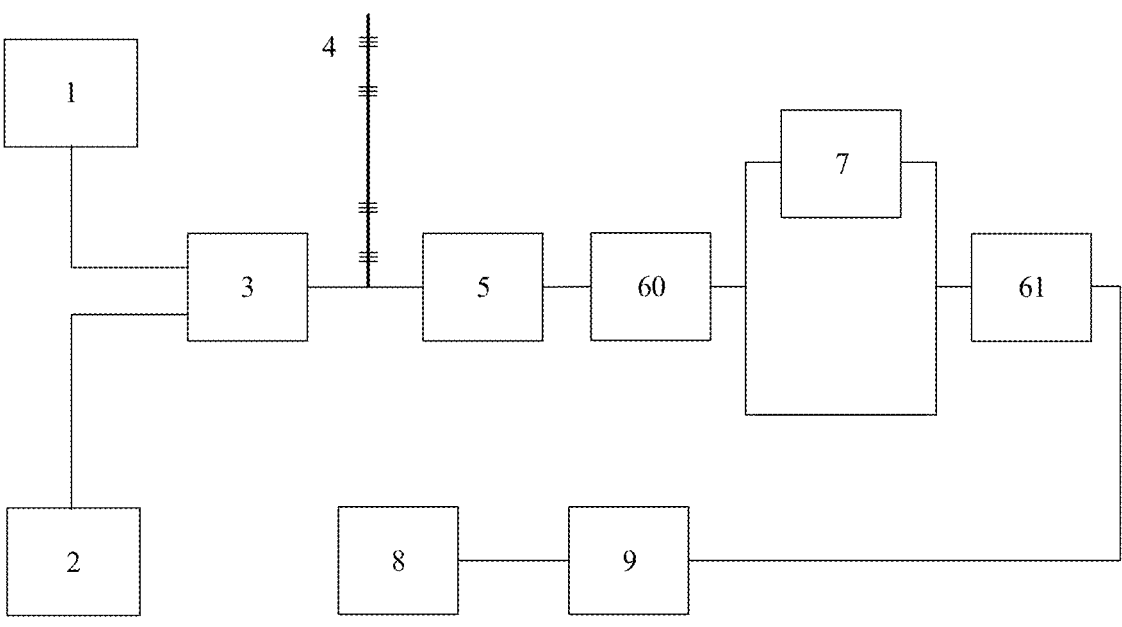
FIG. 3 is a structural diagram of a fiber optic sensor provided in the present disclosure.

In addition, fiber optic couplers are generally less expensive than photodetectors. Therefore, instead of providing two photodetectors in the fiber optic sensor, one photodetector may be provided, with the first split signal and the second split signal are coupled into one signal through the fiber optic coupler, then the coupled signal is input into the photodetector. Since only one photodetector needs to be provided in the fiber optic sensor, the solution is more cost-effective and has stronger applicability. In the solution, the fiber optic sensor may be provided with the first fiber optic coupler and the second fiber optic coupler. As illustrated in FIG. 3.

FIG. 3 is a structural diagram of a fiber optic sensor provided in the present disclosure. The fiber optic sensor consists of at least the following components: a light source 1, a vector network analyzer 2, an electro-optic intensity modulator 3, a fiber optic 4 containing a weak reflection grating array, a fiber optic amplifier 5, a first fiber optic coupler 60, a second fiber optic coupler 61, a dispersion compensator 7, a demodulator 8, and a photodetector 9.

The input end of the first fiber optic coupler 60 is connected with the output end of the fiber optic amplifier 5, the output end of the first fiber optic coupler 60 is connected with the input end of the second fiber optic coupler 61 and the input end of the dispersion compensator 7, the input end of the second fiber optic coupler 61 is connected with the output end of the first fiber optic coupler 60 and the output end of the dispersion compensator 7, and the output end of the second fiber optic coupler 61 is coupled with the demodulator 8.

Therefore, the first fiber optic coupler 60 may split the received and amplified reflected signal to obtain the first split signal and the second split signal, input the first split signal into the dispersion compensator 7, and input the second split signal into the second fiber optic coupler 61.

Then, the dispersion compensator 7 may perform dispersion compensation on the received first split signal, and input the dispersion-compensated first split signal into the second fiber optic coupler 61.

The second fiber optic coupler 61 may couple the received dispersion-compensated first split signal and the second split signal, to obtain a signal to be measured, and input the signal to be measured into the demodulator 8 via the photodetector 9. In a feasible implementation, an optical amplifier may be provided after the second fiber optic coupler 61 to amplify the combined optical signals. Specifically, the optical amplifier may be coupled to the second fiber optic coupler 61 and the demodulator 8, and is used to: receive the signal to be measured output by the second fiber optic coupler 61, amplify the signal to be measured, and input an amplified signal to be measured into the demodulator 8.

Then the demodulator 8 may determine the component signal corresponding to the dispersion-compensated first split signal and the component signal corresponding to the second split signal in the received signal to be measured. Then by adopting the above-mentioned method of determining the change amounts respectively corresponding to the gratings in the fiber optic 4, based on the dispersion-compensated first split signal and the second split signal. According to the different components of the received signal to be measured, the change amount for each grating in the fiber optic 4 containing the weak reflection grating array is determined.

Further, when the external environment where the fiber optic sensor is located changes, not only the center wavelength corresponding to the grating contained in the fiber optic sensor will change, but also the refractive index and length of the fiber optic segment between two adjacent gratings will also change. As a result, the optical path difference corresponding to the fiber optic segment will also change. Therefore, after determining the dispersion-compensated first split signal and the second split signal, the demodulator 8 may also, based on the dispersion-compensated first split signal and the second split signal, determine the change amount of each fiber optic segment in the fiber optic 4 containing the weak reflection grating array.

Specifically, the demodulator 8 may, for every two adjacent sub-signals of the second split signal, determine delays when the two sub-signals are transmitted along the fiber optic 4, respectively as the first delay and the second delay determined at the current moment. For example, if the two adjacent gratings corresponding to these two adjacent sub-signals are the first grating and the second grating, then the first delay determined at the current moment is the above-determined $t_1$, the second delay determined at the current moment is the above-determined $t_2$.

Secondly, the demodulator 8 may determine the difference between the first delay and the second delay as the first gap. And the historical first delay and the historical second delay are determined based on the historical second split signal at the historical measurement moment, and the difference between the historical first delay and the historical second delay is determined, then the difference is used as the second gap. Then the difference between the first gap and the second gap is the optical path delay. That is to say, the change amount between the gap between the first delay and the second delay determined at the current moment, and the gap between the first historical delay and the second historical delay determined at the historical measurement moment, can be used to represent the delay caused by changes in the optical path difference of the fiber optic segment between the two adjacent gratings.

Then, the demodulator 8 may, based on the optical path delay, determine the change amount of the optical path difference of the fiber optic segment between the two adjacent gratings.

Assume that the two adjacent gratings are the i-th grating and the (i+1)-th grating. If the speed of light is c, the optical path difference of the fiber optic segment connecting the i-th grating and the (i+1)-th grating is $OPD_i$, the change amount of the optical path difference is $\Delta OPD_i$, then the following formula can be obtained:

$$\Delta t_i = \frac{\Delta OPD_i}{c},$$

Where, $\Delta t_i$ represents the difference between the first gap between the first delay $t_i$ corresponding to the ith grating and the second delay $t_{i+1}$ corresponding to the (i. 1)-th grating at the current moment, and the second gap between the historical first delay $t_{hi}$ corresponding to the ith grating and the historical second delay $t_{hi+1}$ corresponding to the (i+1)-th grating at the historical measurement moment. That is, the difference between the first gap and the second gap. Then, based on the known first delay and the second delay, the demodulator 8 may determine the change amount of the optical path difference corresponding to the fiber optic segment between the two adjacent gratings.

Finally, the demodulator 8 may according to the determined change amount of the optical path difference and the physical properties of the fiber optic 4 containing the weak reflection grating array, determine the change amount of the fiber optic segment between the two adjacent gratings. The physical properties at least include an elastic-optic effect coefficient, a thermo-optic effect coefficient, a thermal expansion coefficient, an effective refractive index, and a physical length of the fiber optic segment between the two adjacent gratings.

For example, the physical properties of the fiber optic 4 containing the weak reflection grating array include: the elastic-optic effect coefficient O, the thermo-optic effect coefficient P, the thermal expansion coefficient Q, $S_i$ represents the effective refractive index of the fiber optic segment between the i-th grating and the (i+1)-th grating, L; represents the physical length of the fiber optic segment between the i-th grating and the (i+1)-th grating, then based on the optical path difference formula, the following formula can be established:

$$\Delta OPD_i = 2S_iL_i[(1-O)X_{OF}+(P+Q)Z_{OF}]$$

Where, $X_{OF}$ represents the strain degree of the fiber optic segment, $Z_{OF}$ represents the temperature change amount of the fiber optic segment.

Thus, the demodulator 8 may determine the change amounts respectively corresponding to the gratings in the fiber optic 4 containing the weak reflection grating array, as well as change amounts respectively corresponding to fiber optic segments among gratings. Therefore, the fiber optic sensor in the present disclosure can realize fully distributed measurement of fiber optic temperature and strain for a fiber optic 4 containing a weak reflection grating array.

It should be noted that, the historical measurement moment (for ease of description, hereafter referred to as the first historical measurement moment) corresponding to the data used when determining the change amount of the optical path difference of the fiber optic, and the historical measurement moment (for ease of description, hereafter referred to as the second historical measurement moment) corresponding to the data used when determining the change amount of the grating, may be the same moment, or may be different moments. Moreover, the first historical measurement moment, similar to the second historical measurement moment, may be the previous measurement moment, the initial measurement moment, any one or a specified number of measurement moments between the initial measurement moment and the previous measurement moment. The number of specific measurement moments determined by the demodulator 8 and the corresponding specific moments may be adjusted as needed, which is not limited in the present disclosure.

Further, temperature and strain in the external environment can affect change amounts determined by the fiber optic sensor. For an object to be measured, the purpose of applying the fiber optic sensor to the object to be measured may be to determine the deformation or the temperature change of the object. Therefore, the above-mentioned fiber optic 4 containing the weak reflection grating array in the fiber optic sensor can specifically include a target fiber optic and a reference fiber optic. Assuming A is the target variable. The target fiber optic is used to determine environmental changes of the object to be measured, and the reference fiber optic is used to exclude changes in the target fiber optic caused by other environmental variables in the environment of the object to be measured except the target variable.

Specifically, when using a fiber optic sensor to measure the deformation of an object to be measured, the target fiber optic is fixedly connected to the object to be measured, and the reference fiber optic is floatingly connected to the object to be measured. The floating connection may be any one connection method that makes the reference fiber optic not affected by the deformation of the object to be measured. For example, a floating connection may be made by placing the reference fiber in a hollow stainless steel to isolate it from the deformation of the object to be measured.

Thus, based on the reference fiber, the change amounts respectively corresponding to positions in the reference fiber, caused by environmental variables other than the deformation of the object to be measured may be determined. The change amount corresponding to the reference fiber optic is subtracted from the change amount corresponding to the target fiber optic to obtain the change amount of the target fiber optic caused by the deformation change of the object to be measured.

Of course, when using a fiber optic sensor to measure the temperature change of an object to be measured, both the target fiber optic and the reference fiber optic may also be fixedly connected to the object to be measured. A heat insulation layer is provided between the reference fiber optic and the object to be measured, to minimize the influence of the reference fiber optic from the temperature change of the object to be measured.

Thus, based on the reference fiber, the change amounts respectively corresponding to positions in the reference fiber, caused by environmental variables other than the temperature change of the object to be measured may be determined. The change amount corresponding to the reference fiber optic is subtracted from the change amount corresponding to the target fiber optic to obtain the change amount of the target fiber optic caused by the temperature change of the object to be measured.

Further, in the case where the fiber optic 4 in the above-mentioned fiber optic sensor specifically includes a target fiber optic and a reference fiber optic, the output end of the electro-optic intensity modulator 3 in the fiber optic sensor can be connected to the input end of the reference fiber optic and the target fiber optic, that is to say, the optical signal output from the output end of the electro-optic intensity modulator 3 in the fiber optic sensor may be input into the reference fiber optic and the target fiber optic. Then the input end of the fiber optic amplifier 5 can receive the reflected signals of the reference fiber optic and the target fiber optic.

Specifically, the demodulator 8 may according to the received second split signal and the dispersion-compensated first split signal corresponding to the reference fiber optic, determine the change amount at each grating and at each fiber optic segment between gratings in the reference fiber optic as the first change amount.

Then, the demodulator 8 may according to the received second split signal and the dispersion-compensated first split signal corresponding to the target fiber optic, determine the change amount at each grating and at each fiber optic segment between gratings in the target fiber optic as the second change amount.

Finally, the demodulator 8 may, according to the first change amounts and the second change amounts, determine the change amount, e.g., temperature change amount, or deformation amount.

In addition, in the present disclosure, to isolate the input and output of optical signals as much as possible, the fiber optic sensor also includes a fiber optic circulator 10. The fiber optic circulator 10 may include an input/output end, an input end, and an output end, and the input/output end of the fiber optic circulator 10 is connected to the fiber optic 4 containing a weak reflection grating array.

The light source 1, the vector network analyzer 2, the electro-optic intensity modulator 3, and the input end of the fiber optic circulator 10 form an input optical path of the fiber optic 4 containing a weak reflection grating array.

Figure 4:
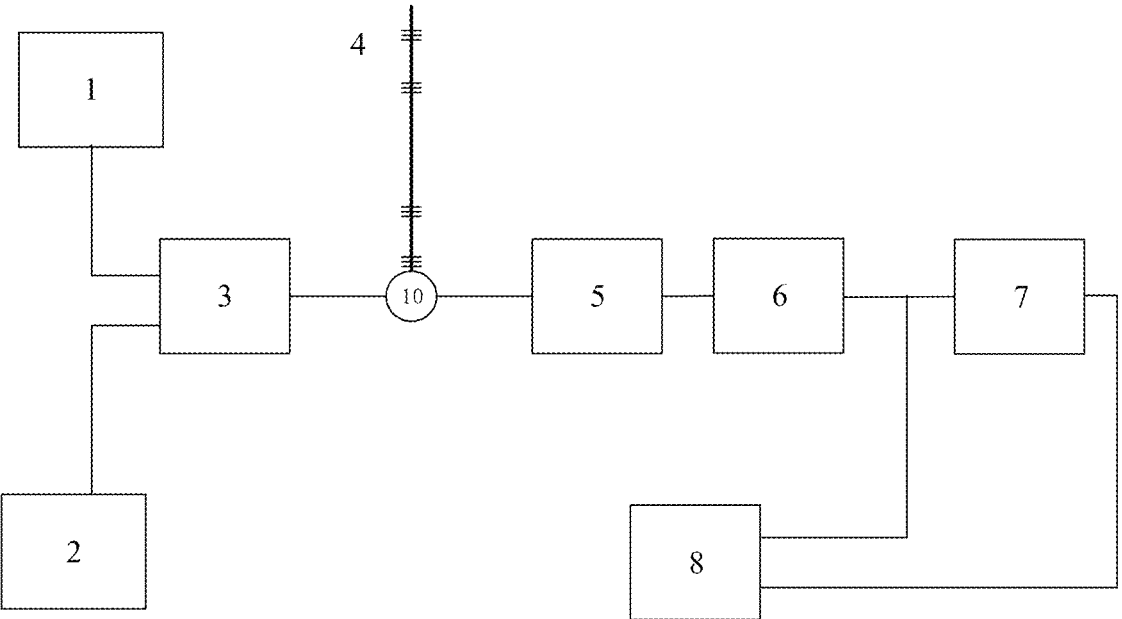
FIG. 4 is a structural diagram of a fiber optic sensor provided in the present disclosure.

The output end of the fiber optic circulator 10, the fiber optic amplifier 5, the fiber optic coupler 6, the dispersion compensator 7, and the demodulator 8 form the output optical path of the fiber optic 4 containing the weak reflection grating array. As illustrated in FIG. 4.

FIG. 4 is a structural diagram of a fiber optic sensor provided in the present disclosure. Where, the fiber optic sensor consists of at least the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8, and a fiber optic circulator 10.

The input/output end of the fiber optic circulator 10 is coupled to the fiber optic 4 containing a weak reflection grating array, the output end of the electro-optic intensity modulator 3 is coupled to the input end of the fiber optic circulator 10, and the output end of fiber optic circulator 10 is coupled to the input end of the fiber optic amplifier 5.

Then the fiber optic circulator 10 may input the optical signal modulated by the electro-optic intensity modulator 3 into the fiber optic 4 containing the weak reflection grating array, and input the reflected signal generated by the fiber optic 4 containing the weak reflection grating array into the fiber optic amplifier 5.

It should be noted that the above-mentioned demodulator 8 may be an electronic device with computing capabilities, or may be a module in a vector network analyzer for analyzing received signals. Thus, the output end of the photodetector 9 may be connected to the vector network analyzer 2.

Then the vector network analyzer 2 may based on the received electrical signal and the generated microwave signal, for each frequency of the microwave signal, obtain the amplitude and phase information at the frequency. And by scanning the frequency of the microwave signal to complete the synchronous measurement of the optical signals respectively corresponding to frequencies of the microwave signal, the amplitude and phase response of each signal received by the vector network analyzer is obtained, i.e., the frequency domain response, that is, the frequency domain signal. Then the frequency domain signal may be expressed as:

$$H(\Omega) = \sum_{i=1}^{N} D_i^2 \exp\left[-j\Omega(t_i + K)\right] + \sum_{i=1}^{N} FD_i^2 \exp\left[-j\Omega(t_i + K + G_i)\right],$$

The physical meaning of each parameter may be referred to the explanation of the corresponding parameter above, and will not be described again here. In the embodiment of the present disclosure, the optical path between two adjacent weak reflection gratings can be much longer than the coherence length of the light source 1, so that the interference between the reflected signals of the weak reflection gratings can be ignored, thereby making the fiber optic sensor have higher stability and adaptability to environmental disturbances.

Thus, after the frequency domain signal is determined, since in the present disclosure it is necessary to determine, based on delays, the change amounts respectively corresponding to each position in the fiber optic 4 containing the weak reflection grating array, the demodulator may convert the frequency domain signal into a time domain signal, for example, the time domain signal can be obtained by applying the inverse Fourier transform to the frequency domain information. The time domain signal may be expressed as:

$$h(t) = \sum_{i=1}^{N} D_i^2 \delta(t - t_i - K) + \sum_{i=1}^{N} FD_i^2 \delta(t - t_i - K - G_i),$$

Where, $\delta(\ )$ represents the Dirac function, the physical meaning of other parameters may be referred to the explanation of the corresponding parameters above and will not be repeated here.

Then based on the determined time domain signal, that is, based on the second split signal and the dispersion-compensated first split signal, the demodulator 8 may determine the change amount of the center wavelength of each grating and the change amount of the optical path difference of each fiber optic segment between adjacent gratings in the fiber optic 4, so as to determine the change amount of each position in the fiber optic 4. For the specific processing process, please refer to the above, which will not be repeated here.

When the distance between adjacent weak reflection gratings is relatively close, in the present disclosure, since the corresponding time domain signal is determined based on the frequency domain signal corresponding to the reflected signal and the measurement is performed based on the time domain signal, therefore, there is no superposition of the reflected signals corresponding to two adjacent gratings, ensuring the measurement efficiency. The light source 1 is, for example, a low-correlation broadband light source with a wavelength range of 1528-1563 nm and an output optical power of 10 mW.

Based on the same idea, the present disclosure provides a measurement method, as illustrated in FIG. 5.

FIG. 5 is a flowchart of a measurement method provided in the present disclosure. The measurement method is applied to a fiber optic sensor, the fiber optic sensor consists of at least the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, and a demodulator 8. Where:

S100: Inputting a modulated optical signal into a fiber optic 4 containing a weak reflection grating array, where the modulated optical signal is generated according to an optical signal generated by the light source 1 and a microwave signal generated by the vector network analyzer 2.

In one or more embodiments provided in the present disclosure, the fiber optic sensor can use the microwave signal generated by the vector network analyzer 2 via the electro-optic intensity modulator 3 to modulate the optical signal generated by the light source 1, and input the modulated optical signal into the fiber optic 4 containing the weak reflection grating array.

S102: Splitting a reflected signal generated by the fiber optic 4 containing the weak reflection grating array to obtain a first split signal and a second split signal, and performing dispersion compensation on the first split signal to obtain a dispersion-compensated first split signal.

S104: According to a historical second split signal and a dispersion-compensated historical first split signal determined at a historical measurement moment, and the second split signal and the dispersion-compensated first split signal determined at a current moment, determining a change delay for each sub-signal in the dispersion-compensated first split signal and a change delay for each sub-signal in the second split signal at the current moment.

S106: For each sub-signal, according to a change delay of the sub-signal, determining a change amount at a grating corresponding to the sub-signal and a change amount at a fiber optic segment connected with the grating.

In one or more embodiments provided in the present disclosure, for the specific execution process of each step in the above-mentioned steps S100-S106, please refer to the above description of the working process of each component in the fiber optic sensor. The description will not be repeated here.

Figure 6:
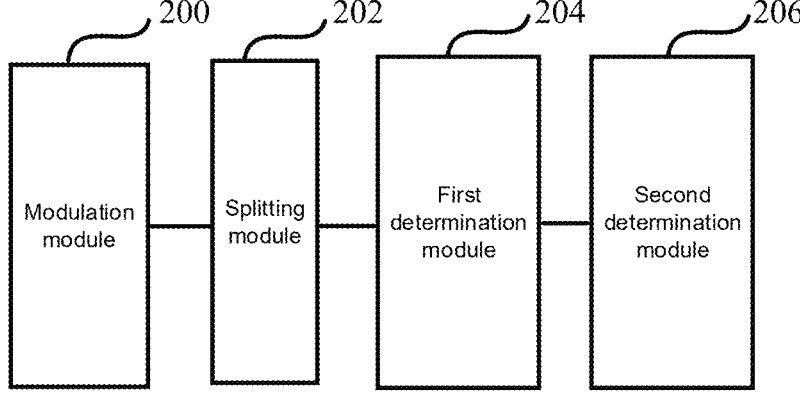
FIG. 6 is a structural diagram of a measurement apparatus provided in the present disclosure.

The above are fiber optic sensors and measurement methods provided by one or more embodiments of the present disclosure, based on the same idea, the present disclosure also provides the corresponding measurement apparatus, as illustrated in FIG. 6.

FIG. 6 is a structural diagram of a measurement apparatus provided in the present disclosure, the measurement apparatus is applied to a fiber optic sensor, the fiber optic sensor consists of at least the following components: a light source 1, a vector network analyzer 2, an electro-optic intensity modulator 3, a fiber optic 4 containing a weak reflection grating array, a fiber optic amplifier 5, a fiber optic coupler 6, a dispersion compensator 7, a demodulator 8; the apparatus includes:

a modulation module 200, configured to: input a modulated optical signal into the fiber optic 4 containing the weak reflection grating array, where the modulated optical signal is generated according to an optical signal generated by the light source 1 and a microwave signal generated by the vector network analyzer 2;

a splitting module 202, configured to: split a reflected signal generated by the fiber optic 4 containing the weak reflection grating array to obtain a first split signal and a second split signal, and perform dispersion compensation on the first split signal to obtain a dispersion-compensated first split signal;

a first determination module 204, configured to: according to a historical second split signal and a dispersion-compensated historical first split signal determined at a historical measurement moment 204, and the second split signal and the dispersion-compensated first split signal determined at a current moment, determine a change delay for each sub-signal in the dispersion-compensated first split signal and a change delay for each sub-signal in the second split signal at the current moment;

a second determination module 206, configured to: for each sub-signal, according to a change delay of the sub-signal, determine a change amount at a grating corresponding to the sub-signal and a change amount at a fiber optic segment connected with the grating.

The present disclosure provides a computer-readable storage medium storing a computer program, where, when the computer program is executed by a processor the above measurement method is implemented.

Figure 7:
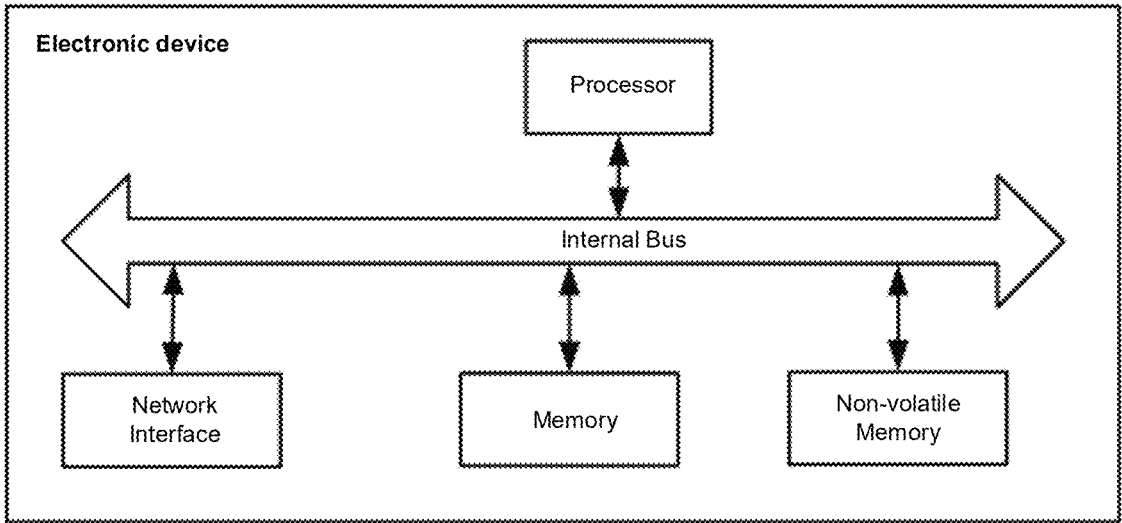
FIG. 7 is a diagram of an electronic device corresponding to FIG. 5 provided in the present disclosure.

The present disclosure also provides a structure diagram of an electronic device illustrated FIG. 7 corresponding to FIG. 5. As illustrated FIG. 7, at the hardware level, the electronic device includes a processor, an internal bus, a network interface, a memory, and a non-volatile memory, and certainly can also include the hardware required by other services. The processor reads the corresponding computer program from non-volatile memory into memory and runs it to achieve the method illustrated in FIG. 5.

Of course, apart from software implementation methods, the present disclosure does not exclude other implementation methods, such as logical devices or combinations of software and hardware, etc. This means that the execution subject of the following processing flow is not limited to each logical unit, but also can be hardware or logical devices.

In the 1990s, for a technological improvement, there was a clear distinction between an improvement in hardware (for example, for the circuit structure of diodes, transistors, switches, etc.) and an improvement in software (for methods and processes). However, with the development of technology, the improvement of many methods and processes can be regarded as a direct improvement of the structure of a hardware circuit. Designers almost always obtain the corresponding hardware circuit structure by programming the improved method or process into a hardware circuit. Therefore, it is possible that an improvement of a method or a process is realized by entity modules of hardware. For example, a Programmable Logic Device (PLD) e.g., a Field Programmable Gate Array (FPGA), is such an integrated circuit whose logic function is determined by the user programming the device. A digital system is "integrated" on a PLD through the programming of the designers, rather than a dedicated integrated circuit chip designed and produced by a chip manufacturer. Moreover, nowadays, instead of making integrated circuit chips manually, this programming is mostly implemented using "logic compiler" software, which is similar to the software compiler used in program development, and the original code before compilation must be written in a specific programming language, which is called a Hardware Description Language (HDL). There are multiple HDLs rather than one, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and the most commonly used currently are Very-High-Speed Integrated Circuit Hardware Description Language (VHDL) and Verilog. A person of ordinary skill in the art should also understand that by logically programming the method or process using the above-mentioned several hardware description languages and integrated it into an integrated circuit, a hardware circuit that implements such logic method or process can be easily obtained.

The controller can be implemented in any suitable manner. For example, the controller can take the form of a microprocessor or processor and a computer-readable medium, logic gates, switches, Application Specific Integrated Circuits (ASICs), programmable logic controllers, and embedded microcontrollers storing computer-readable program code (such as software or firmware) executable by the (micro) processor. Examples of the controller include, but are not limited to, the following microcontrollers: ARC 625D, Atmel AT91SAM, Microchip PIC18F26K20, and Silicone Labs C8051F320. The memory controller can also be implemented as part of the control logic for the memory. A person of ordinary skill in the art also know that, in addition to implementing the controller in pure computer-readable program codes, it is entirely possible to make the controller logic gates, switches, dedicated integrated circuits, programmable logic controllers, embedded microcontrollers and the like to achieve the same function by logically programming the method and the steps. Therefore, such a controller can be regarded as a hardware component, and apparatuses included in the controller for implementing various functions can also be regarded as structures within the hardware component. Or even, devices for implementing various functions can be regarded as both software modules implementing the method and structures within hardware component.

The system, apparatus, module, or unit described in the previous embodiments may be implemented by a computer chip or entity, or may be implemented by using a product with a certain function. A typical implementation device is a computer. The computer may be a personal computer, a laptop computer, a cellular phone, a camera phone, a smartphone, a personal digital assistant, a media player, a navigation device, an email device, a game console, a tablet computer, a wearable device, or any combination of these devices.

For convenience of description, when describing the above apparatus, the functions are divided into various units and described separately. Of course, when implementing the present disclosure, the functions of the units may be implemented in the same software or multiple software and/or hardware.

Those skilled in the art should understand that the examples of the present disclosure may be implemented as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

The present disclosure is described with reference to flowcharts and/or block diagrams of methods, devices (systems), and computer program products according to implementations of the present disclosure. It should be understood that, each process and/or block in the flowcharts and/or block diagrams as well as combinations of processes and/or blocks in the flowcharts and/or block diagrams may be implemented by computer program instructions. These computer program instructions may be provided to a processor of a general-purpose computer, a special purpose computer, an embedded processor or other programmable data processing device to generate a machine, such that the instructions executed by the processor of a computer or other programmable data processing device produce a device for achieving the functions specified in a flow chart or processes or processes and/or block diagram of one box or more boxes.

These computer program instructions may also be stored in computer-readable memory capable of booting a computer or other programmable data processing device to work in a particular manner, such that the instructions stored in the computer-readable memory produce manufactured products including an instruction device, the instruction device implements the function specified in a flow chart one or more processes and/or block diagram one box or more boxes.

These computer program instructions may also be loaded into a computer or other programmable data processing device, such that a series of operational steps are performed on a computer or other programmable device to produce computer-implemented processing, so that the instructions executed on a computer or other programmable device provide steps for achieving the functions specified in a flowchart one or more processes and/or block diagram one box or more boxes.

In a typical configuration, a computing device includes one or more processors (CPUs), an input/output interface, a network interface, and a memory.

The memory may include a non-permanent memory, a random access memory (RAM), and/or a non-volatile memory in computer-readable media, such as a read-only memory (ROM) or a flash RAM. Memory is an example of the computer-readable medium.

Computer-readable media includes permanent and non-persistent, removable and non-removable media. Information storage may be accomplished by any method or technology. The information may be computer-readable instructions, data structures, modules of programs, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape storage or other magnetic storage devices or any other non-transmitting medium which can be used to store information that can be accessed by a computing device. As defined herein, computer-readable media does not include temporary computer-readable media, such as modulated data signals and carrier waves.

It should also be noted that the terms "including", "comprising" or any other variants are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including (comprising) a/an . . . " do not exclude the existence of other identical elements in the process, method, article or apparatus that include the elements.

Those skilled in the art should understand that the examples of the present disclosure may be implemented as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

This disclosure may be described in the general context of computer-executable instructions executed by a computer, such as program modules. Generally, program modules include routines, programs, objects, components, data structures, etc. that perform specific tasks or implement specific abstract data types. The present disclosure may also be practiced in distributed computing environments in which tasks are performed by remote processing devices connected through a communication network. In a distributed computing environment, program modules may be located in local and remote computer storage media, including storage devices.

Each embodiment in the present disclosure is described in a progressive manner, and the same or similar parts between the various embodiments may be referred to each other. Each embodiment focuses on the differences between itself and from other embodiments. In particular, with respect to the system implementations, since they are basically similar to the method implementations, the description thereof is relatively simple. For the related parts, reference may be made to the description of the method implementations.

The invention claimed is:

1. A fiber optic sensor, at least comprising: a light source, a vector network analyzer, an electro-optic intensity modulator, a fiber optic containing a weak reflection grating array, a fiber optic amplifier, a fiber optic coupler, a dispersion compensator, a demodulator;

wherein, the electro-optic intensity modulator, coupled to the light source, the vector network analyzer, and the fiber optic containing the weak reflection grating array, is configured to:

modulate a microwave signal generated by the vector network analyzer into an optical signal generated by the light source, and input a modulated optical signal into the fiber optic containing the weak reflection grating array;

the fiber optic amplifier, coupled to the fiber optic containing the weak reflection grating array and the fiber optic coupler, is configured to:

receive a reflected signal output by the fiber optic containing the weak reflection grating array, and input an amplified reflected signal into the fiber optic coupler;

the fiber optic coupler, coupled to the fiber optic amplifier, the dispersion compensator, and the demodulator, is configured to:

split the amplified reflected signal, input an obtained first split signal into the dispersion compensator, and input an obtained second split signal into the demodulator;

the dispersion compensator, coupled to the fiber optic coupler and the demodulator, is configured to:

perform dispersion compensation on the first split signal, and input a dispersion-compensated first split signal into the demodulator;

the demodulator, coupled to the fiber optic coupler and the dispersion compensator, is configured to:

demodulate a received signal to obtain each sub-signal of the second split signal and each sub-signal of the dispersion-compensated first split signal;

according to a historical second split signal and a dispersion-compensated historical first split signal determined at a historical measurement moment, and the second split signal and the dispersion-compensated first split signal determined at a current moment, determine a change delay for each sub-signal in the dispersion-compensated first split signal and a change delay for each sub-signal in the second split signal at the current moment; and for each of the sub-signals, according to a change delay for the sub-signal, determine change amounts at a grating corresponding to the sub-signal and at a fiber optic segment connected with the grating.

2. The fiber optic sensor according to claim 1, wherein the fiber optic coupler comprises a first fiber optic coupler and a second fiber optic coupler;

the first fiber optic coupler, coupled to the fiber optic amplifier, the dispersion compensator, and the second fiber optic coupler, is configured to:

split the amplified reflected signal which is amplified by the fiber optic amplifier, input the obtained first split signal into the dispersion compensator, and input the obtained second split signal into the second fiber optic coupler;

the dispersion compensator, coupled to the first fiber optic coupler and the second fiber optic coupler, is configured to input the dispersion-compensated first split signal into the second fiber optic coupler;

the second fiber optic coupler, coupled to the first fiber optic coupler, the dispersion compensator, and the demodulator, is configured to:

couple the dispersion-compensated first split signal and the second split signal, to obtain a signal to be measured, and input the signal to be measured into the demodulator.

3. The fiber optic sensor according to claim 2, further comprising an optical amplifier coupled to the second fiber optic coupler and the demodulator;

the optical amplifier is configured to:

receive the signal to be measured output by the second fiber optic coupler, amplify the signal to be measured, and input an amplified signal to be measured into the demodulator.

4. The fiber optic sensor according to claim 1, further comprising a fiber optic circulator, wherein an input end of the fiber optic circulator is coupled to an output end of the electro-optic intensity modulator, an input/output end of the fiber optic circulator is coupled to the fiber optic containing the weak reflection grating array, and an output end of the fiber optic circulator is coupled to the fiber optic amplifier.

5. The fiber optic sensor according to claim 1, further comprising a photodetector;

an input end of the photodetector is coupled to an output end of the fiber optic coupler and an output end of the dispersion compensator, an output end of the photodetector is coupled to an input end of the demodulator, the photodetector is configured to:

obtain a first electrical signal corresponding to the dispersion-compensated first split signal, obtain a second electrical signal corresponding to the second split signal, and input the first electrical signal and the second electrical signal into the demodulator;

the demodulator is further configured to:

determine a historical first electrical signal determined at the historical measurement moment as the dispersion-compensated historical first split signal, determine a historical second electrical signal determined at the historical measurement moment as the historical second split signal, determine the first electrical signal determined at the current moment as the dispersion-compensated first split signal, and determine the second electrical signal determined at the current moment as the second split signal.

6. The fiber optic sensor according to claim 1, further comprising a fiber optic polarizer coupled to the light source, and a fiber optic polarization controller coupled to the fiber optic polarizer and the electro-optic intensity modulator;

wherein the fiber optic polarizer and the fiber optic polarization controller are configured to perform polarization control on the optical signal generated by the light source.

7. The fiber optic sensor according to claim 1, wherein the fiber optic containing the weak reflection grating array comprises a target fiber optic connected with an object to be measured and a reference fiber optic floatingly connected with the object to be measured; wherein, the demodulator is further configured to:

according to a received second split signal and a dispersion-compensated first split signal corresponding to the reference fiber optic, determine change amounts at each grating and at each fiber optic segment between gratings in the reference fiber optic, to obtain a first change amount;

according to a received second split signal and a dispersion-compensated first split signal corresponding to the target fiber optic, determine change amounts at each grating and at each fiber optic segment between gratings in the target fiber optic, to obtain a second change amount; and according to the first change amount and the second change amount, determine a change amount of the object to be measured.

8. The fiber optic sensor according to claim 1, wherein the demodulator is configured to:

determine a dispersion compensation function corresponding to the dispersion compensator;

for each of the sub-signals in the dispersion-compensated first split signal, according to the determined change delay of the signal and the dispersion compensation function, determine a change amount of a center wavelength of the grating corresponding to the sub-signal; and according to the change amount of the center wavelength and physical properties of the fiber optic containing the weak reflection grating array, determine the change amount at the grating corresponding to the sub-signal;

wherein, the physical properties at least comprise an elastic-optic effect coefficient and a thermo-optic effect coefficient.

9. The fiber optic sensor according to claim 8, wherein a dispersion delay introduced by the dispersion compensator to perform dispersion comprises a change delay and a historical delay;

the demodulator is further configured to:

according to the dispersion-compensated first split signal, determine dispersion delays of sub-signals respectively corresponding to gratings in the fiber optic containing the weak reflection grating array;

according to the dispersion-compensated historical first split signal, determine historical delays of the sub-signals respectively corresponding to the gratings in the fiber optic containing the weak reflection grating array; and for each of the gratings, according to the historical delay and the dispersion delay of the sub-signal corresponding to the grating, determine a change delay of the sub-signal corresponding to the grating.

10. The fiber optic sensor according to claim 9, wherein the demodulator is further configured to:

for each of the gratings in the fiber optic containing the weakly reflective-weak reflection grating array, according to the dispersion-compensated first split signal, determine a third delay of the sub-signal corresponding to the grating at the current moment, and a fourth delay of a sub-signal corresponding to an adjacent grating of the grating; and according to the third delay and the fourth delay determined at the current moment, and a historical third delay and a historical fourth delay determined according to the dispersion-compensated historical first split signal, determine the change delay.

11. The fiber optic sensor according to claim 1, wherein the demodulator is further configured to:

for every two adjacent sub-signals of the second split signal, determine delays when the two sub-signals are transmitted along the fiber optic containing the weak reflection grating array, respectively as a first delay and a second delay determined at the current moment;

according to the first delay and the second delay, and a historical first delay and a historical second delay determined according to the historical second split signal, determine an optical path delay;

according to the optical path delay, determine a change amount of an optical path difference of the fiber optic segment between the two adjacent gratings corresponding to the two sub-signals; and according to the change amount of the optical path difference and physical properties of the fiber optic containing the weak reflection grating array, determine a change amount at the fiber optic segment between the two adjacent gratings;

wherein, the physical properties at least comprise an elastic-optic effect coefficient, a thermo-optic effect coefficient, an effective refractive index, and a physical length of the fiber optic segment between the two adjacent gratings.

12. The fiber optic sensor according to claim 1, wherein the change amount comprises at least one of a temperature change amount or a deformation amount.

13. A measurement method, wherein the measurement method is applied to a fiber optic sensor, the fiber optic sensor at least comprises following components: a light source, a vector network analyzer, an electro-optic intensity modulator, a fiber optic containing a weak reflection grating array, a fiber optic amplifier, a fiber optic coupler, a dispersion compensator, a demodulator;

the method comprises:

inputting a modulated optical signal into the fiber optic containing the weak reflection grating array, wherein the modulated optical signal is generated according to an optical signal generated by the light source and a microwave signal generated by the vector network analyzer;

splitting a reflected signal generated by the fiber optic containing the weak reflection grating array to obtain a first split signal and a second split signal, and performing dispersion compensation on the first split signal to obtain a dispersion-compensated first split signal;

according to a historical second split signal and a dispersion-compensated historical first split signal determined at a historical measurement moment, and the second split signal and the dispersion-compensated first split signal determined at a current moment, determining a change delay for each sub-signal in the dispersion-compensated first split signal and a change delay for each sub-signal in the second split signal at the current moment; and for each of the sub-signals, according to a change delay for the sub-signal, determining a change amount at a grating corresponding to the sub-signal and a change amount at a fiber optic segment connected with the grating.

* * * * *